(12) United States Patent
Hagita et al.

(10) Patent No.: US 12,404,813 B2
(45) Date of Patent: Sep. 2, 2025

(54) CONTROL METHOD FOR GAS TURBINE COMBUSTOR AND CONTROL DEVICE FOR GAS TURBINE COMBUSTOR

(71) Applicant: MITSUBISHI HEAVY INDUSTRIES, LTD., Tokyo (JP)

(72) Inventors: Tatsuya Hagita, Tokyo (JP); Yoshitaka Hirata, Tokyo (JP); Mitsuhiro Karishuku, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/727,215

(22) PCT Filed: Jan. 13, 2023

(86) PCT No.: PCT/JP2023/000738
§ 371 (c)(1),
(2) Date: Jul. 8, 2024

(87) PCT Pub. No.: WO2023/140183
PCT Pub. Date: Jul. 27, 2023

(65) Prior Publication Data
US 2025/0092834 A1 Mar. 20, 2025

(30) Foreign Application Priority Data
Jan. 20, 2022 (JP) .................. 2022-006878

(51) Int. Cl.
*F02C 9/40* (2006.01)
*F02C 3/20* (2006.01)
(Continued)

(52) U.S. Cl.
CPC .................. *F02C 9/40* (2013.01); *F02C 3/20* (2013.01); *F02C 3/22* (2013.01); *F02C 7/228* (2013.01);
(Continued)

(58) Field of Classification Search
CPC .... F02C 9/263; F02C 9/32; F02C 9/40; F02C 3/20; F02C 3/22; F02C 7/228;
(Continued)

(56) References Cited

U.S. PATENT DOCUMENTS 9,027,349 B2 * 5/2015 Miura .................. F23R 3/286
 60/737
9,074,772 B2 * 7/2015 Miura .................. F23R 3/286
(Continued)

FOREIGN PATENT DOCUMENTS

JP  2008-292139  12/2008
JP  2009-074706  4/2009
(Continued)

OTHER PUBLICATIONS

International Search Report issued Mar. 28, 2023 in International (PCT) Application No. PCT/JP2023/000738, with English translation.

(Continued)

*Primary Examiner* — William H Rodriguez
(74) *Attorney, Agent, or Firm* — Wenderoth, Lind & Ponack, L.L.P.

(57) ABSTRACT

A control method for a gas turbine combustor including an air-hole plate having a plurality of air holes formed therein, and a plurality of fuel nozzles corresponding to respective ones of the plurality of air holes. The gas turbine combustor is operable to combust a hydrogen fuel and a fuel other than the hydrogen fuel. The air holes include: first air holes having, among passageways from an entry end to an exit end, an inclined passageway extending in a direction inclined with respect to the central axis of the air-hole plate in a region including at least the exit end; and second air holes extending in parallel to the central axis. The fuel nozzles include first fuel nozzles corresponding to respective (Continued)

first air holes, and second fuel nozzles corresponding to respective second air holes. During hydrogen fuel firing, the hydrogen fuel is not supplied to the first fuel nozzles.

9 Claims, 8 Drawing Sheets

(51) Int. Cl.
  *F02C 3/22* (2006.01)
  *F02C 7/228* (2006.01)
  *F02C 7/232* (2006.01)
  *F02C 9/26* (2006.01)
  *F02C 9/32* (2006.01)
  *F23R 3/28* (2006.01)
  *F23R 3/34* (2006.01)
  *F23R 3/36* (2006.01)

(52) U.S. Cl.
  CPC .............. *F02C 7/232* (2013.01); *F02C 9/263* (2013.01); *F02C 9/32* (2013.01); *F23R 3/286* (2013.01); *F23R 3/34* (2013.01); *F23R 3/36* (2013.01)

(58) Field of Classification Search
  CPC .. F02C 7/232; F23R 3/286; F23R 3/34; F23R 3/36; F23R 3/28
  See application file for complete search history.

(56) References Cited

U.S. PATENT DOCUMENTS

| | | | |
|---|---|---|---|
| 10,018,359 B2 | 7/2018 | Abe et al. | |
| 10,041,680 B2* | 8/2018 | Asai | F23R 3/343 |
| 10,408,457 B2* | 9/2019 | Akiyama | F02C 3/14 |
| 2004/0000146 A1* | 1/2004 | Inoue | F02C 7/232 |
| | | | 60/776 |
| 2007/0003897 A1* | 1/2007 | Koizumi | F23R 3/28 |
| | | | 431/354 |
| 2009/0223226 A1 | 9/2009 | Koizumi et al. | |
| 2010/0064694 A1* | 3/2010 | Dodo | F23D 11/408 |
| | | | 60/734 |
| 2012/0094239 A1* | 4/2012 | Miura | F23R 3/12 |
| | | | 431/9 |
| 2014/0083102 A1* | 3/2014 | Miura | F23R 3/10 |
| | | | 60/737 |
| 2015/0059353 A1* | 3/2015 | Asai | F23R 3/26 |
| | | | 60/785 |
| 2016/0040883 A1* | 2/2016 | Asai | F23R 3/10 |
| | | | 60/737 |
| 2017/0138598 A1* | 5/2017 | Akiyama | F02C 3/14 |
| 2017/0284671 A1* | 10/2017 | Asai | F23R 3/283 |
| 2018/0112604 A1* | 4/2018 | Akiyama | F02C 7/232 |
| 2020/0072466 A1* | 3/2020 | Akiyama | F23R 3/286 |
| 2020/0200389 A1* | 6/2020 | Uruno | F23R 3/28 |
| 2021/0095599 A1* | 4/2021 | Asai | F02C 7/228 |
| 2021/0095849 A1* | 4/2021 | Asai | F23R 3/46 |
| 2021/0095850 A1* | 4/2021 | Asai | F23R 3/343 |

FOREIGN PATENT DOCUMENTS

| | | |
|---|---|---|
| JP | 2009-210200 | 9/2009 |
| JP | 2010-065963 | 3/2010 |
| JP | 2010-133339 | 6/2010 |
| JP | 2014-105601 | 6/2014 |
| JP | 2014-122723 | 7/2014 |
| JP | 2016-038108 | 3/2016 |
| JP | 5940227 | 5/2016 |
| JP | 2018-071354 | 5/2018 |
| JP | 2018-150912 | 9/2018 |
| JP | 2021-055644 | 4/2021 |

OTHER PUBLICATIONS

International Preliminary Report on Patentability issued Jul. 23, 2024 in International (PCT) Application No. PCT/JP2023/000738, with English translation.

* cited by examiner

CONTROL METHOD FOR GAS TURBINE COMBUSTOR AND CONTROL DEVICE FOR GAS TURBINE COMBUSTOR

TECHNICAL FIELD

The present disclosure relates to a control method for a gas turbine combustor and a control device for a gas turbine combustor.

The present application claims priority based on Japanese Patent Application No. 2022-006878 filed in Japan on Jan. 20, 2022, the contents of which are incorporated herein by reference.

BACKGROUND ART

A gas turbine combustor is known in which an air-hole plate is disposed between a fuel nozzle and a combustion chamber and which is configured to eject a fuel flow and an air flow formed on an outer peripheral side of the fuel flow into the combustion chamber inside air holes provided in the air-hole plate (for example, see PTL 1).

CITATION LIST

Patent Literature

[PTL 1] Japanese Unexamined Patent Application Publication No. 2018-150912

SUMMARY OF INVENTION

Technical Problem

For example, as in a gas turbine combustor disclosed in PTL 1, in a case where the air holes extend in a direction inclined with respect to a central axis of the air-hole plate, there is a concern that a region where a flow velocity is relatively small may occur locally in the air-hole plate or at a position relatively close to the air-hole plate. For example, in a case in which hydrogen having a relatively fast combustion speed is used as a fuel, the above-described region may be a starting point for an occurrence of backfire, and in a case in which the backfire occurs, there is a concern that a flame may continuously remain in the above-described region. In a case where the flame continuously remains in the region, there is a concern that the combustor may be damaged.

At least one embodiment of the present disclosure aims to suppress damage to a gas turbine combustor that combusts a hydrogen fuel and another fuel other than the hydrogen fuel in view of the above-described circumstances.

Solution to Problem (1) A control method for a gas turbine combustor according to at least one embodiment of the present disclosure is a control method for the gas turbine combustor that includes an air-hole plate in which a plurality of air holes are formed and a plurality y of fuel nozzles corresponding to the plurality of air holes, respectively, and that combusts a hydrogen fuel and another fuel other than the hydrogen fuel, in which the plurality of air holes include a plurality of first air holes each having an inclined passageway that extends in a direction inclined with respect to a central axis of the air-hole plate in a region including at least an exit end in a passageway from an entry end to the exit end, and a plurality of second air holes that extend parallel to the central axis, and the plurality of fuel nozzles include a plurality of first fuel nozzles corresponding to the plurality of first air holes, respectively, and a plurality of second fuel nozzles corresponding to the plurality of second air holes, respectively, the control method including:

supplying no hydrogen fuel to the plurality of first fuel nozzles when the hydrogen fuel is exclusively combusted.

(2) A control device for a gas turbine combustor according to at least one embodiment of the present disclosure is a control device for controlling combustion in the gas turbine combustor that includes an air-hole plate in which a plurality of air holes are formed and a plurality of fuel nozzles corresponding to the plurality of air holes, respectively, and that combusts a hydrogen fuel and another fuel other than the hydrogen fuel, in which the plurality of air holes include a plurality of first air holes each having an inclined passageway that extends in a direction inclined with respect to a central axis of the air-hole plate in a region including at least an exit end in a passageway from an entry end to the exit end, and a plurality of second air holes that extend parallel to the central axis, and the plurality of fuel nozzles include a plurality of first fuel nozzles corresponding to the plurality of first air holes, respectively, and a plurality of second fuel nozzles corresponding to the plurality of second air holes, respectively, the control device including:

a fuel flow rate regulating valve that regulates a flow rate of a fuel supplied to the plurality of first fuel nozzles, and a fuel flow rate control unit that controls the fuel flow rate regulating valve, in which the fuel flow rate control unit controls the fuel flow rate regulating valve such that no hydrogen fuel is supplied to the plurality of first fuel nozzles when the hydrogen fuel is exclusively combusted.

Advantageous Effects of Invention

According to at least one embodiment of the present disclosure, it is possible to suppress damage to a gas turbine combustor that combusts a hydrogen fuel and another fuel other than the hydrogen fuel.

DESCRIPTION OF EMBODIMENTS

Figure 1:
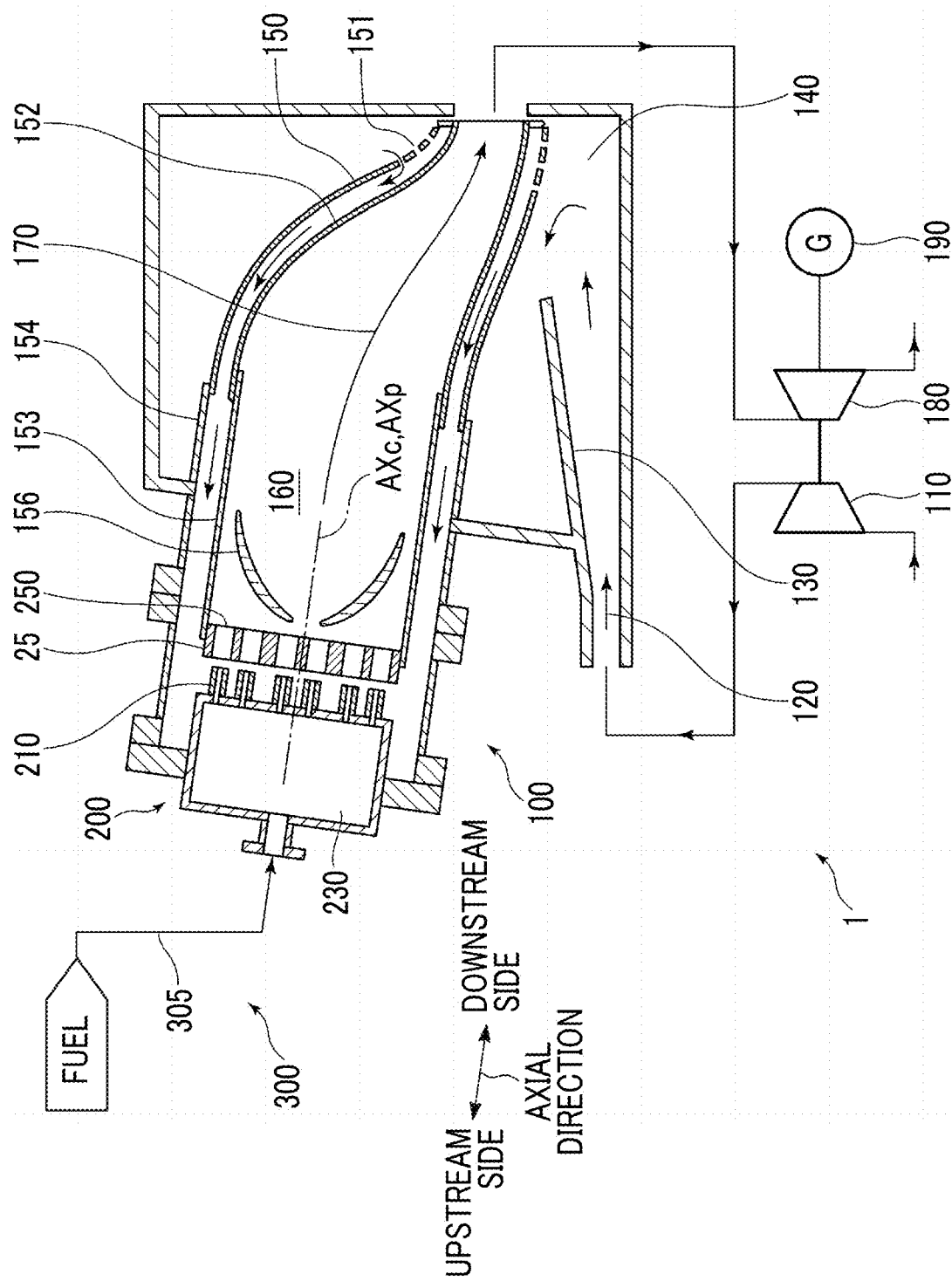
FIG. 1 shows a schematic configuration of a gas turbine including a gas turbine combustor according to some embodiments.

Hereinafter, some embodiments of the present disclosure will be described with reference to the accompanying drawings. Dimensions, materials, shapes, relative arrangements, and the like of components described as embodiments or illustrated in the drawings are not intended to limit the scope of the present disclosure, but are merely explanatory examples.

For example, an expression representing a relative or absolute arrangement such as "in a certain direction", "along a certain direction", "parallel", "orthogonal", "center", "concentric", or "coaxial" does not strictly represent only such an arrangement, but also a tolerance or a state of being relatively displaced with an angle or a distance to the extent that the same function can be obtained.

For example, expressions such as "identical", "equal", and "homogeneous" indicating that things are in an equal state do not strictly represent only the equal state, but also a tolerance or a state where there is a difference to the extent that the same function can be obtained.

For example, an expression representing a shape such as a quadrangular shape or a cylindrical shape does not represent only a shape such as a quadrangular shape or a cylindrical shape in a geometrically strict sense, but also a shape including an uneven portion, a chamfered portion, and the like within a range in which the same effect can be obtained.

Meanwhile, the expressions "being provided with", "comprising", "including", or "having" one component are not exclusive expressions excluding the presence of other components.

A gas turbine combustor according to some embodiments of the present disclosure will be described with reference to FIGS. 1, and 2A and 2B.

FIG. 1 shows a schematic configuration of a gas turbine including a gas turbine combustor according to some embodiments of the present disclosure.

A gas turbine 1 shown in FIG. 1 includes an air compressor 110, a gas turbine combustor 100, and a turbine 180.

Figure 2A:
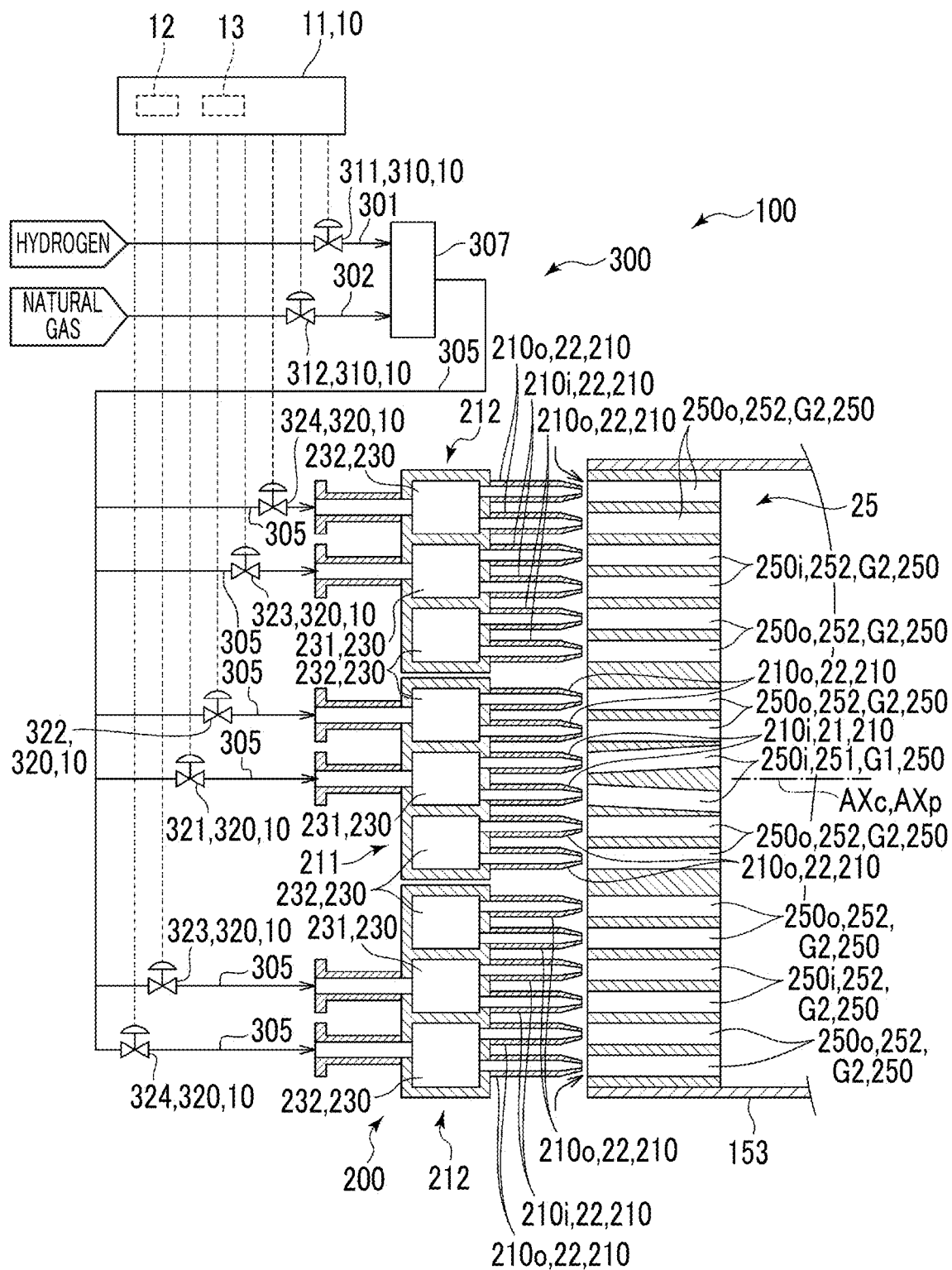
FIG. 2A is a schematic partial sectional view showing a structure in a vicinity of a burner in a gas turbine combustor according to one embodiment provided in the gas turbine shown in FIG. 1.
Figure 2B:
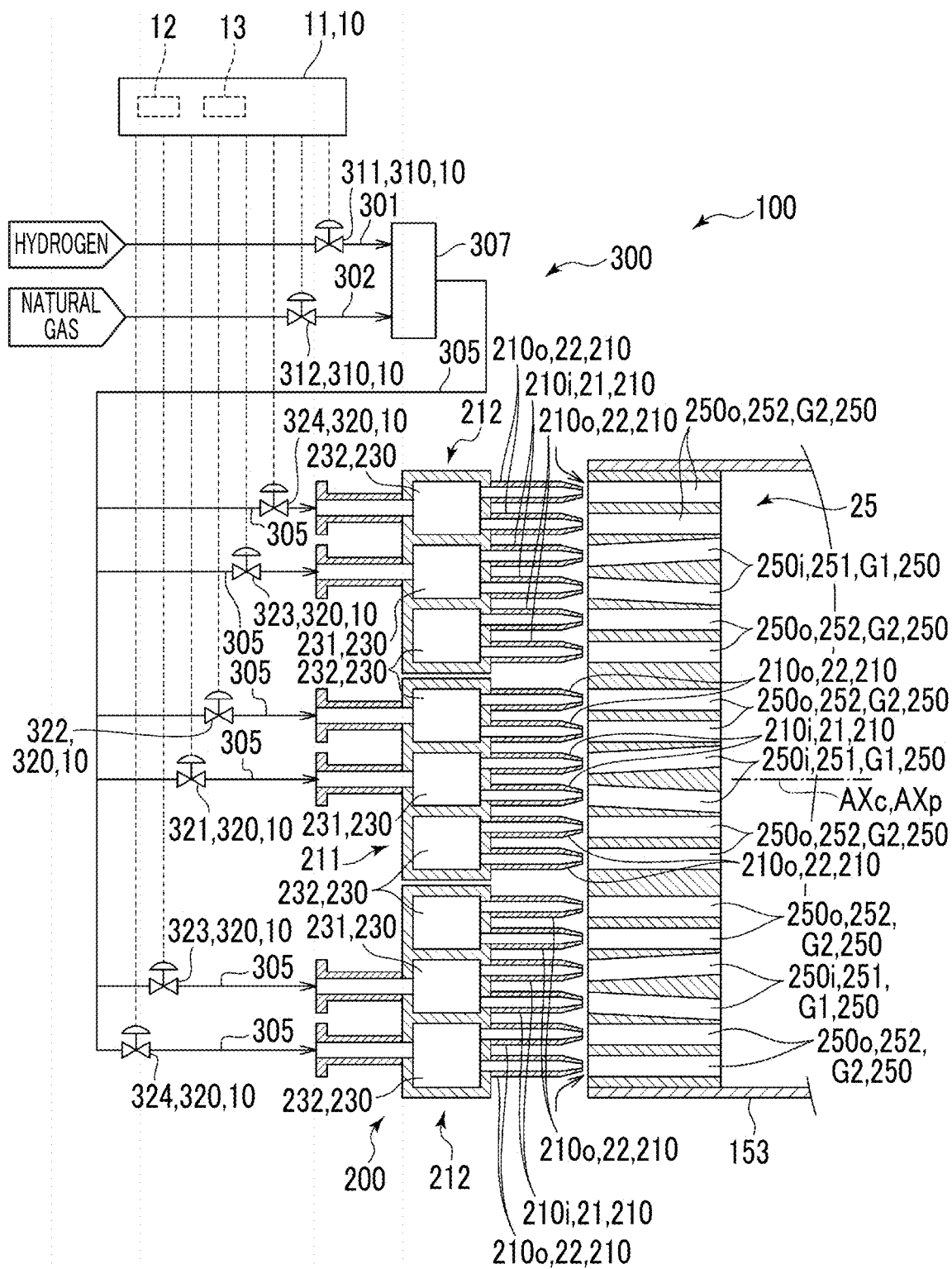
FIG. 2B is a schematic partial sectional view showing a structure in a vicinity of a burner in a gas turbine combustor according to another embodiment provided in the gas turbine shown in FIG. 1.

The gas turbine combustor 100 according to some embodiments includes a combustor liner (inner cylinder) 153, a liner flow sleeve (outer cylinder) 154, a transition piece 152, a transition piece flow sleeve 150, a burner 200, a fuel system 300, and a control device 10 (see FIG. 2A and FIG. 2B). In FIG. 1, the burner 200 and the fuel system 300 are shown in a simplified manner, and only one fuel header 230 and only one fuel supply pipe 305, which will be described below, are shown. The burner 200 and the fuel system 300 will be described later.

In the gas turbine 1 shown in FIG. 1, the air compressor 110 is rotationally driven by the turbine 180 to compress air (suctioned air) suctioned from the atmosphere through an intake portion (not shown) to generate high-pressure air (combustion air) 120, and supplies the high-pressure air 120 to the gas turbine combustor 100. The gas turbine combustor 100 combusts the high-pressure air 120 supplied from the air compressor 110 by mixing the high-pressure air 120 with a fuel supplied from the fuel system 300 to generate a high-temperature combustion gas 170, and supplies the high-temperature combustion gas 170 to the turbine 180.

That is, in the gas turbine 1 shown in FIG. 1, the high-pressure air 120 which is combustion air discharged from the air compressor 110 is introduced into a casing 140 from a diffuser 130, and flows into a flow path formed in a gap between the transition piece flow sleeve 150 and the transition piece 152 disposed inside the transition piece flow sleeve 150 from an air introduction hole 151 provided in the transition piece flow sleeve 150 of the gas turbine combustor 100.

Thereafter, the high-pressure air 120 flowing into the flow path formed in the gap flows into a flow path formed in a gap between the combustor liner 153 of the gas turbine combustor 100 and the liner flow sleeve 154 disposed concentrically with the combustor liner 153 on an outer peripheral side of the combustor liner 153. Thereafter, a flow of the high-pressure air 120 is reversed and introduced from the fuel system 300. The high-pressure air 120 is mixed with a fuel injected from a plurality of fuel nozzles 210 forming a cluster nozzle, and is combusted in a combustion chamber 160 inside the combustor liner 153 to form a flame 156 and to generate a high-temperature and high-pressure combustion gas 170.

In this way, the high-temperature and high-pressure combustion gas 170 generated in the gas turbine combustor 100 flows down in the transition piece 152, and is introduced into the turbine 180.

In the turbine 180 forming the gas turbine 1, a work amount generated when the high-temperature and high-pressure combustion gas 170 introduced into the turbine 180 is subjected to adiabatic expansion is converted into a shaft rotational force by the turbine 180. In this manner, an output is obtained from a generator 190 by driving the generator 190 connected to the turbine 180 by a turbine shaft.

The air compressor 110 and the generator 190 which form the gas turbine 1 are connected to the turbine 180 by the turbine shaft. However, the air compressor 110, the turbine 180, and the generator 190 may not have a configuration in which the turbine shaft has a single shaft, and may have a configuration in which the turbine shaft has two or more shafts.

In addition, the gas turbine which is generally widely used in a thermal power plant has a configuration in which a plurality of the gas turbine combustors are radially arranged with respect to the turbine shaft.

FIG. 2A is a schematic partial sectional view showing a structure in a vicinity of the burner 200 in the gas turbine combustor 100 according to one embodiment provided in the gas turbine 1 shown in FIG. 1.

FIG. 2B is a schematic partial sectional view showing a structure in the vicinity of the burner 200 in the gas turbine combustor 100 according to another embodiment provided in the gas turbine 1 shown in FIG. 1.

Figure 3A:
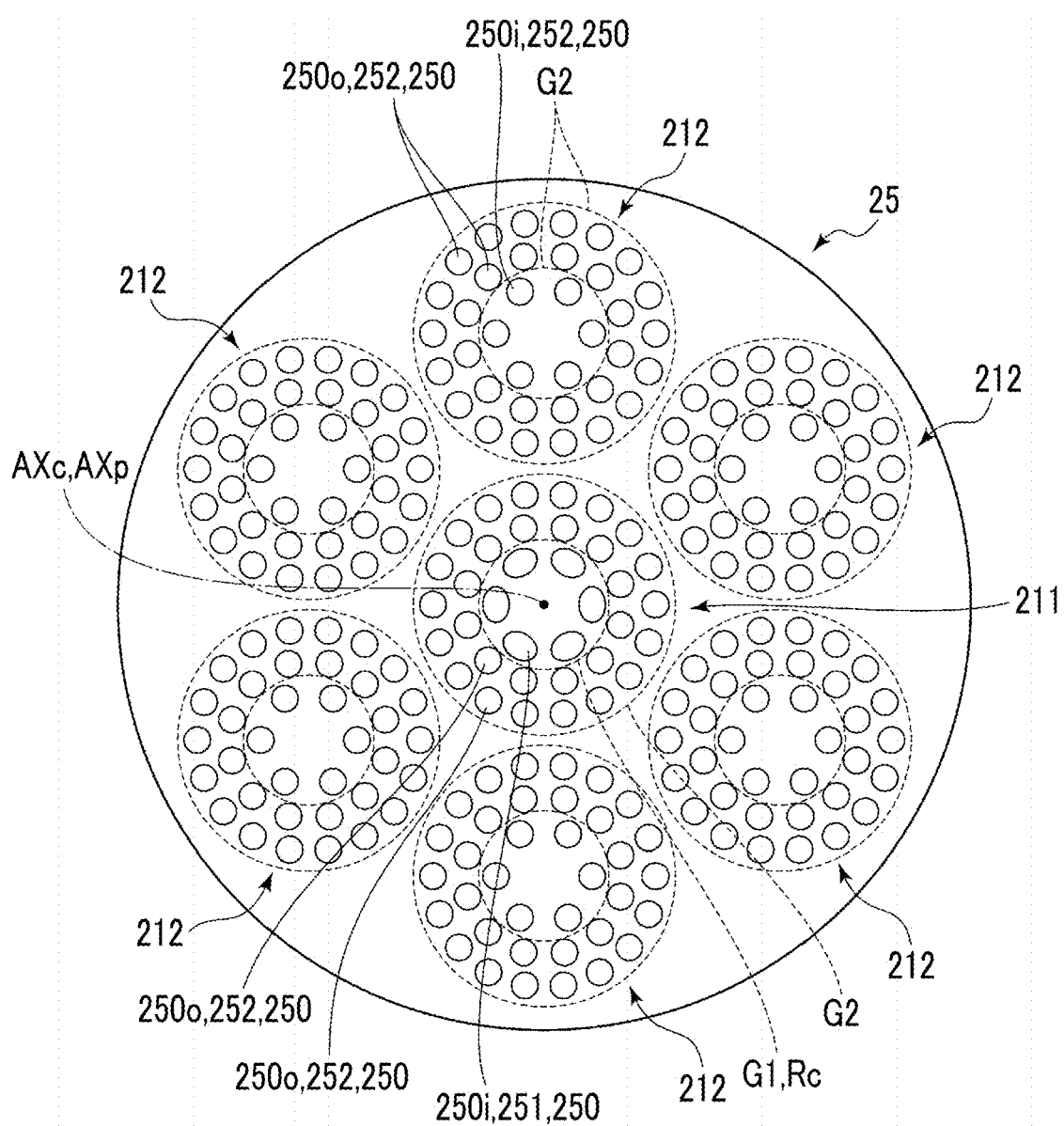
FIG. 3A is a view of an air-hole plate of the burner according to the embodiment shown in FIG. 2A when viewed from an axial downstream side.

FIG. 3A is a view of an air-hole plate 25 of the burner 200 according to the embodiment shown in FIG. 2A when viewed from an axial downstream side.

Figure 3B:
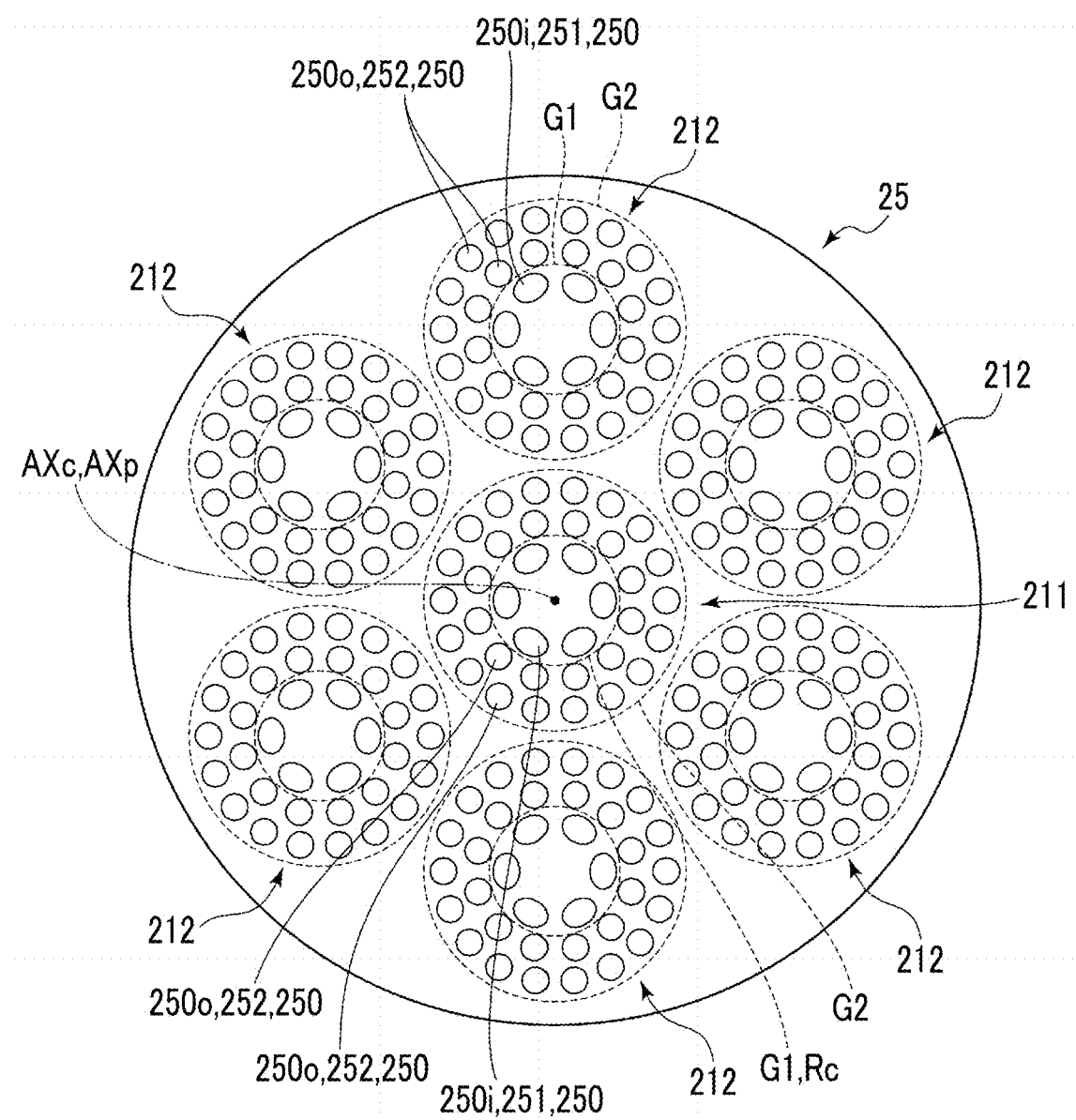
FIG. 3B is a view of an air-hole plate of the burner according to the other embodiment shown in FIG. 2B when viewed from the axial downstream side.

FIG. 3B is a view of the air-hole plate 25 of the burner 200 according to the other embodiment shown in FIG. 2B when viewed from the axial downstream side.

In the following description, a direction along a central axis AXc of the gas turbine combustor 100 will be referred to as an axial direction of the gas turbine combustor 100, or will be also simply referred to as an axial direction. A direction in which the combustion gas 170 flows along the axial direction will be referred to as the axial downstream side, or will be simply referred to as a downstream side. A direction opposite to the direction in which the combustion gas 170 flows will be referred to as an axial upstream side, or will be simply referred to as an upstream side.

In the gas turbine combustor 100 according to some embodiments, the central axis AXc of the gas turbine combustor 100 is, for example, a central axis of the combustor liner 153 having a cylindrical shape. In the gas turbine combustor 100 according to some embodiments, the central axis AXc of the gas turbine combustor 100 coincides with a central axis AXp of the air-hole plate 25.

(About Details of Gas Turbine Combustor 100)

The gas turbine combustor 100 according to some embodiments is a gas turbine combustor capable of combusting a hydrogen fuel and another fuel other than the hydrogen fuel. In the gas turbine combustor 100 according to some embodiments, a natural gas fuel is combusted as the other fuel. In the gas turbine combustor 100 according to some embodiments, the hydrogen fuel can be exclusively combusted, the natural gas fuel can be exclusively combusted, and the hydrogen fuel and the natural gas fuel can be mixed-combusted.

As shown in FIGS. 2A and 2B, in the gas turbine combustor 100 according to some embodiments, the burner 200 is disposed to be orthogonal to the central axis AXc (central axis of the combustor liner 153) of the gas turbine combustor 100, and is provided at an end portion of the combustor liner 153 on the axial upstream side. In the gas turbine combustor 100 according to some embodiments, the burner 200 includes the fuel header 230, the plurality of fuel nozzles 210, and the air-hole plate 25.

The gas turbine combustor 100 according to some embodiments is a combustor of a type called a cluster combustor. In the gas turbine combustor 100 according to some embodiments, a plurality of air holes 250 are formed in the air-hole plate 25. Each of the plurality of fuel nozzles 210 is disposed to correspond to each of the plurality of air holes 250 formed in the air-hole plate 25 disposed close to an axial downstream side of the fuel nozzles 210.

A tip of each of the fuel nozzles 210 need not be inserted into each of the air holes 250 as shown in FIGS. 2A and 2B, or may be inserted into each of the air holes 250.

As shown in FIGS. 2A, 2B, 3A, and 3B, in the gas turbine combustor 100 according to some embodiments, the burner 200 is a so-called multi-burner including one central burner 211 disposed coaxially with the combustor liner 153 at a center and a plurality of (six in the present embodiment) outer burners 212 disposed around the central burner 211. The central burner 211 and the outer burners 212 are each divided into a plurality of (three in the present embodiment) concentric annular rows. In the following description, the plurality of annular rows of the central burner 211 and the outer burners 212 are appropriately referred to as a first row, a second row, and a third row, respectively, from an inner peripheral side toward an outer peripheral side.

(Central Burner 211)

In the gas turbine combustor 100 according to some embodiments, the central burner 211 includes the fuel header 230, the plurality of fuel nozzles 210, and the plurality of air holes 250 formed in the air-hole plate 25. The central burner 211 is supported by the fuel header 230. The fuel nozzle 210 of the central burner 211 is disposed concentrically in the first to third rows of the central burner 211 and is provided over an entire circumference of each row (is annularly disposed). The fuel nozzle 210 of the central burner 211 injects a fuel supplied from the fuel system 300 toward the air holes 250 formed in the air-hole plate 25.

In the gas turbine combustor 100 according to some embodiments, the fuel header 230 of the central burner 211 includes an inner peripheral fuel header 231 and an outer peripheral fuel header 232 provided to surround a radial outer side of the inner peripheral fuel header 231.

In the gas turbine combustor 100 according to some embodiments, the plurality of fuel nozzles 210 of the central burner 211 include an inner peripheral fuel nozzle 210$i$ connected to the inner peripheral fuel header 231 and an outer peripheral fuel nozzle 210$o$ connected to the outer peripheral fuel header 232.

In the gas turbine combustor 100 according to some embodiments, the inner peripheral fuel nozzle 210$i$ of the central burner 211 corresponds to the fuel nozzle 210 of the first row, and the outer peripheral fuel nozzles 210$o$ of the central burner 211 correspond to the fuel nozzles 210 of the second row and the third row.

In the gas turbine combustor 100 according to some embodiments, the air-hole plate 25 includes a plurality of inner peripheral air holes 250$i$ corresponding to a plurality of the inner peripheral fuel nozzles 210$i$ of the central burner 211, respectively, and a plurality of outer peripheral air holes 250$o$ corresponding to a plurality of the outer peripheral fuel nozzles 210$o$ of the central burner 211, respectively.

In the gas turbine combustor 100 according to some embodiments, the first row of the central burner 211 is composed of the inner peripheral fuel header 231, the inner peripheral fuel nozzle 210$i$, and the inner peripheral air hole 250$i$, and the second and third rows are composed of the outer peripheral fuel header 232, the outer peripheral fuel nozzle 210$o$, and the outer peripheral air hole 250$o$.

(Outer Burner 212)

In the gas turbine combustor 100 according to some embodiments, the outer burner 212 includes the fuel header 230, the plurality of fuel nozzles 210, and the plurality of air holes 250 formed in the air-hole plate 25. The outer burner 212 is supported by the fuel header 230. The fuel nozzle 210 of the outer burner 212 is disposed concentrically in the first to third rows of the outer burner 212 and is provided over an entire circumference of each row (is annularly disposed). The fuel nozzle 210 of the outer burner 212 injects the fuel supplied from the fuel system 300 toward the air holes 250 formed in the air-hole plate 25.

In the gas turbine combustor 100 according to some embodiments, the fuel header 230 of the outer burner 212 includes the inner peripheral fuel header 231 and the outer peripheral fuel header 232 provided to surround the radial outer side of the inner peripheral fuel header 231.

In the gas turbine combustor 100 according to some embodiments, the plurality of fuel nozzles 210 of the outer burner 212 include the inner peripheral fuel nozzle 210$i$ connected to the inner peripheral fuel header 231 and the outer peripheral fuel nozzle 210$o$ connected to the outer peripheral fuel header 232.

In the gas turbine combustor 100 according to some embodiments, the inner peripheral fuel nozzle 210*i* of the outer burner 212 corresponds to the fuel nozzle 210 of the first row, and the outer peripheral fuel nozzles 210*o* of the outer burner 212 correspond to the fuel nozzles 210 of the second row and the third row.

In the gas turbine combustor 100 according to some embodiments, the air-hole plate 25 includes the plurality of inner peripheral air holes 250*i* corresponding to the plurality of inner peripheral fuel nozzles 210*i* of the outer burner 212, respectively, and the plurality of outer peripheral air holes 250*o* corresponding to the plurality of outer peripheral fuel nozzles 210*o* of the outer burner 212, respectively.

In the gas turbine combustor 100 according to some embodiments, the first row of the outer burner 212 is composed of the inner peripheral fuel header 231, the inner peripheral fuel nozzle 210*i*, and the inner peripheral air hole 250*i*, and the second and third rows are composed of the outer peripheral fuel header 232, the outer peripheral fuel nozzle 210*o*, and the outer peripheral air hole 250*o*.

Figure 4A:
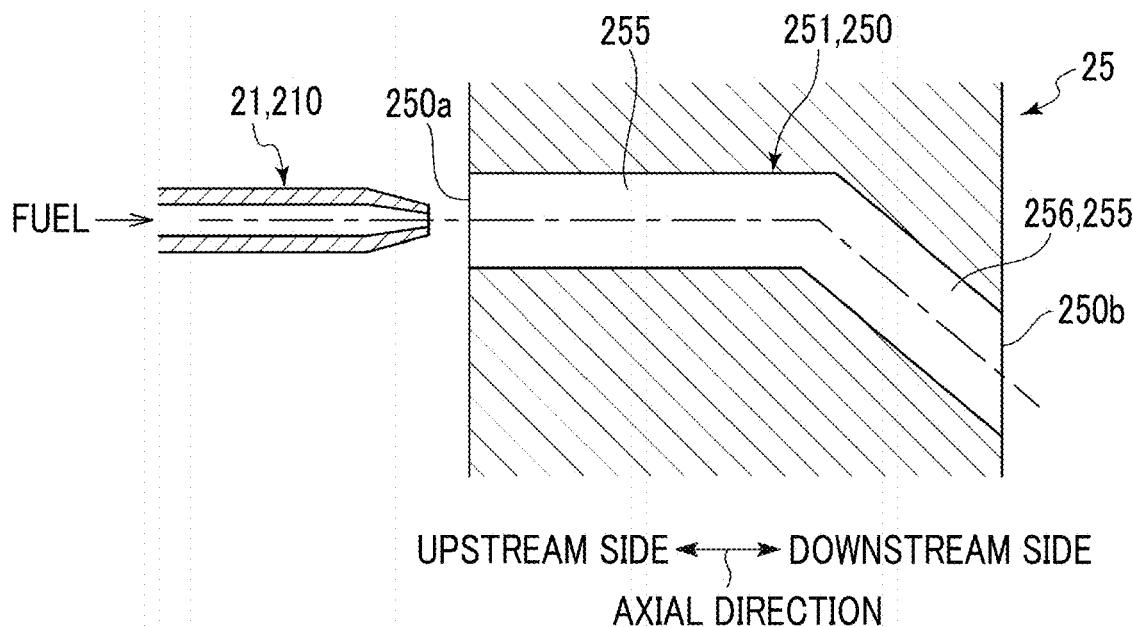
FIG. 4A is a view showing an example of a first air hole in an air hole.

FIG. 4A is a view showing an example of a first air hole 251 in the air hole 250.

Figure 4B:
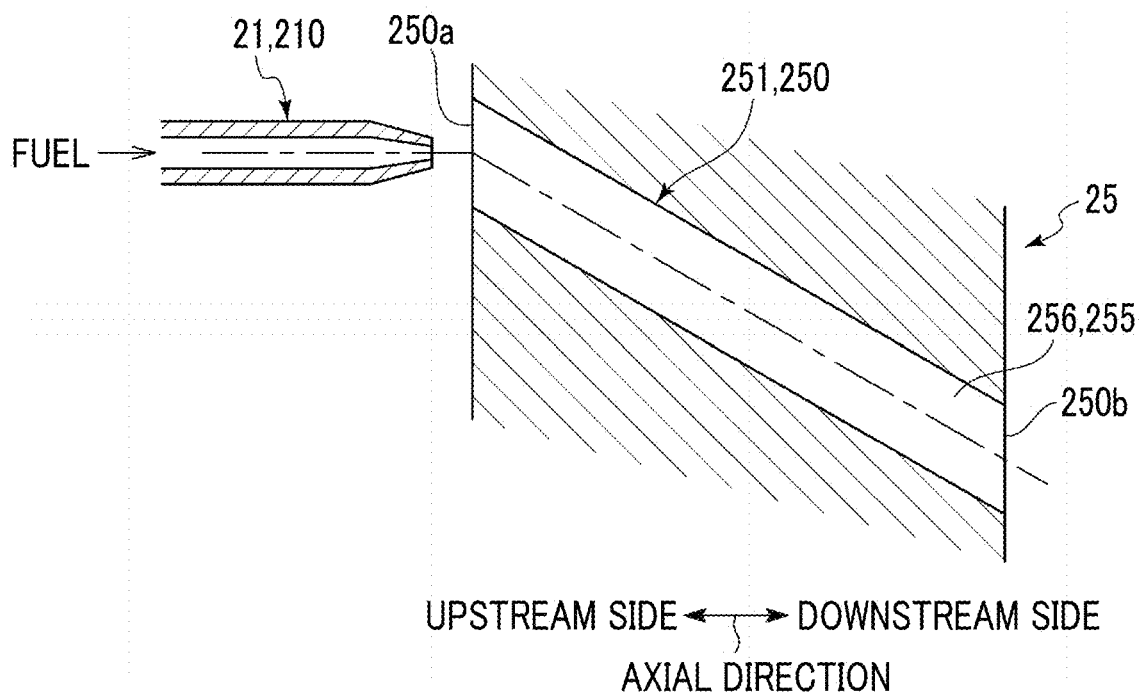
FIG. 4B is a view showing another example of the first air hole in the air hole.

FIG. 4B is a view showing another example of the first air hole 251 in the air hole 250.

As shown in FIGS. 4A and 4B, in the gas turbine combustor 100 according to some embodiments, the plurality of air holes 250 include a plurality of the first air holes 251 each having an inclined passageway 256 that extends in a direction inclined with respect to the central axis AXp of the air-hole plate 25 in a region including at least an exit end 250*b* in a passageway 255 from an entry end 250*a* to the exit end 250*b*, and a plurality of second air holes 252 that extend parallel to the central axis AXp of the air-hole plate 25.

The inclined passageway 256 in the first air hole 251 may be only a part of the passageway 255 on an exit end 250*b* side (axial downstream side) as shown in FIG. 4A, and the passageway 255 on an entry end 250*a* side (axial upstream side) may extend parallel to the central axis AXp of the air-hole plate 25.

In addition, as shown in FIG. 4B, the inclined passageway 256 in the first air hole 251 may extend from the entry end 250*a* to the exit end 250*b*.

In the gas turbine combustor 100 according to some embodiments, the fuel nozzle 210 corresponding to the first air hole 251 is also referred to as a first fuel nozzle 21, and the fuel nozzle 210 corresponding to the second air hole 252 is also referred to as a second fuel nozzle 22.

(About Air Hole 250 of Burner 200 According to Embodiment)

In the burner 200 according to the embodiment shown in FIG. 2A and FIG. 3A, the inner peripheral air hole 250*i* corresponding to the fuel nozzle 210 of the first row of the central burner 211, that is, the inner peripheral fuel nozzle 210*i*, is the first air hole 251.

In the burner 200 according to the embodiment shown in FIG. 2A and FIG. 3A, the inner peripheral air holes 250*i* of the central burner 211 constitute a first air hole group G1 in which the plurality of first air holes 251 are disposed adjacent to each other.

In the burner 200 according to the embodiment shown in FIG. 2A and FIG. 3A, the fuel nozzle 210 of the first row of the central burner 211, that is, the inner peripheral fuel nozzle 210*i*, is the first fuel nozzle 21.

In the burner 200 according to the embodiment shown in FIG. 2A and FIG. 3A, the outer peripheral air holes 250*o* corresponding to the fuel nozzles 210 of the second row and the third row of the central burner 211, that is, the outer peripheral fuel nozzles 210*o*, are the second air holes 252.

In the burner 200 according to the embodiment shown in FIG. 2A and FIG. 3A, the outer peripheral air holes 250*o* of the central burner 211 constitute a second air hole group G2 in which the plurality of second air holes 252 are disposed adjacent to each other.

In the burner 200 according to the embodiment shown in FIG. 2A and FIG. 3A, the fuel nozzles 210 of the second row and the third row of the central burner 211, that is, the outer peripheral fuel nozzles 210*o*, are the second fuel nozzles 22.

In the burner 200 according to the embodiment shown in FIG. 2A and FIG. 3A, the inner peripheral air hole 250*i* and the outer peripheral air holes 250*o* corresponding to the fuel nozzles 210 of the first row and the second and third rows of the outer burner 212, that is, the inner peripheral fuel nozzle 210*i* and the outer peripheral fuel nozzles 210*o*, respectively, are the second air holes 252.

In the burner 200 according to the embodiment shown in FIG. 2A and FIG. 3A, the inner peripheral air hole 250*i* and the outer peripheral air hole 250*o* of the outer burner 212 constitute the second air hole group G2.

In the burner 200 according to the embodiment shown in FIG. 2A and FIG. 3A, all the fuel nozzles 210 of the outer burner 212 are the second fuel nozzles 22.

(About Air Hole 250 of Burner 200 According to Other Embodiment)

In the burner 200 according to the other embodiment shown in FIG. 2B and FIG. 3B, the inner peripheral air hole 250*i* corresponding to the fuel nozzle 210 of the first row of the central burner 211, that is, the inner peripheral fuel nozzle 210*i*, is the first air hole 251.

In the burner 200 according to the other embodiment shown in FIG. 2B and FIG. 3B, the inner peripheral air holes 250*i* of the central burner 211 constitute the first air hole group G1.

In the burner 200 according to the other embodiment shown in FIG. 2B and FIG. 3B, the fuel nozzle 210 of the first row of the central burner 211, that is, the inner peripheral fuel nozzle 210*i*, is the first fuel nozzle 21.

In the burner 200 according to the other embodiment shown in FIG. 2B and FIG. 3B, the outer peripheral air holes 250*o* corresponding to the fuel nozzles 210 of the second row and the third row of the central burner 211, that is, the outer peripheral fuel nozzles 210*o*, are the second air holes 252.

In the burner 200 according to the other embodiment shown in FIG. 2B and FIG. 3B, the outer peripheral air holes 250*o* of the central burner 211 constitute the second air hole group G2.

In the burner 200 according to the other embodiment shown in FIG. 2B and FIG. 3B, the fuel nozzles 210 of the second row and the third row of the central burner 211, that is, the outer peripheral fuel nozzles 210*o*, are the second fuel nozzles 22.

In the burner 200 according to the other embodiment shown in FIG. 2B and FIG. 3B, the inner peripheral air hole 250*i* corresponding to the fuel nozzle 210 of the first row of the outer burner 212, that is, the inner peripheral fuel nozzle 210*i*, is the first air hole 251.

In the burner 200 according to the other embodiment shown in FIG. 2B and FIG. 3B, the inner peripheral air holes 250*i* of the outer burner 212 constitute the first air hole group G1.

In the burner 200 according to the other embodiment shown in FIG. 2B and FIG. 3B, the fuel nozzle 210 of the first row of the outer burner 212, that is, the inner peripheral fuel nozzle 210i, is the first fuel nozzle 21.

In the burner 200 according to the other embodiment shown in FIG. 2B and FIG. 3B, the outer peripheral air holes 250o corresponding to the fuel nozzles 210 of the second row and the third row of the outer burner 212, that is, the outer peripheral fuel nozzles 210o, are the second air holes 252.

In the burner 200 according to the other embodiment shown in FIG. 2B and FIG. 3B, the outer peripheral air holes 250o of the outer burner 212 constitute the second air hole group G2.

In the burner 200 according to the other embodiment shown in FIG. 2B and FIG. 3B, the fuel nozzles 210 of the second row and the third row of the outer burner 212, that is, the outer peripheral fuel nozzles 210o, are the second fuel nozzles 22.

That is, in the burner 200 according to the embodiment shown in FIGS. 2A and 3A, the inner peripheral air hole 250i of the outer burner 212 is the second air hole 252, but in the burner 200 according to the other embodiment shown in FIGS. 2B and 3B, the inner peripheral air hole 250i of the outer burner 212 is the first air hole 251. The burner 200 according to the embodiment shown in FIGS. 2A and 3A and the burner 200 according to the other embodiment shown in FIGS. 2B and 3B have the same configuration except that a type of the inner peripheral air hole 250i of the outer burner 212 is different and a type of the inner peripheral fuel nozzle 210i of the outer burner 212 is different.

(Fuel System 300)

In the gas turbine combustor 100 according to some embodiments, the fuel system 300 includes a hydrogen fuel pipe 301 that is a fuel pipe of the hydrogen fuel, and a natural gas fuel pipe 302 that is a fuel pipe of the natural gas fuel. In the gas turbine combustor 100 according to some embodiments, the fuel system 300 includes a mixing device (mixer) 307 for generating a mixed fuel of the hydrogen fuel and the natural gas fuel, and the fuel supply pipe 305 for supplying the mixed fuel from the mixing device 307 or the hydrogen fuel or the natural gas fuel supplied through the mixing device 307 to each fuel header 230.

In the gas turbine combustor 100 according to some embodiments, the fuel system 300 includes a plurality of fuel flow rate regulating valves 310 and 320 for regulating a flow rate of the fuel.

In the gas turbine combustor 100 according to some embodiments, the fuel flow rate regulating valve 310 includes a hydrogen flow rate regulating valve 311 for regulating a flow rate of the hydrogen fuel supplied to the mixing device 307 via the hydrogen fuel pipe 301, and a natural gas flow rate regulating valve 312 for regulating a flow rate of the natural gas fuel supplied to the mixing device 307 via the natural gas fuel pipe 302.

In the gas turbine combustor 100 according to some embodiments, the hydrogen flow rate regulating valve 311 and the natural gas flow rate regulating valve 312 are each provided with an actuator (not shown) for changing a valve opening degree. In the gas turbine combustor 100 according to some embodiments, a configuration is adopted so that a control signal for driving the actuators is output from a fuel flow rate control unit 11 to be described below.

In the gas turbine combustor 100 according to some embodiments, the fuel flow rate regulating valve 320 is a fuel flow rate regulating valve for regulating a flow rate of the fuel supplied to each fuel header 230. The fuel flow rate regulating valve 320 includes a first fuel flow rate regulating valve 321 for regulating a flow rate of the fuel supplied to the inner peripheral fuel header 231 of the central burner 211, a second fuel flow rate regulating valve 322 for regulating a flow rate of the fuel supplied to the outer peripheral fuel header 232 of the central burner 211, a third fuel flow rate regulating valve 323 for regulating a flow rate of the fuel supplied to the inner peripheral fuel header 231 of the outer burner 212, and a fourth fuel flow rate regulating valve 324 for regulating a flow rate of the fuel supplied to the outer peripheral fuel header 232 of the outer burner 212.

In the gas turbine combustor 100 according to some embodiments, the first fuel flow rate regulating valve 321, the second fuel flow rate regulating valve 322, the third fuel flow rate regulating valve 323, and the fourth fuel flow rate regulating valve 324 are each provided with an actuator (not shown) for changing a valve opening degree.

In the gas turbine combustor 100 according to some embodiments, a configuration is adopted so that a control signal for driving the actuators is output from a fuel flow rate control unit 11 to be described below.

(Control Device 10)

In the gas turbine combustor 100 according to some embodiments, the control device 10 includes the plurality of fuel flow rate regulating valves 310 and 320, and the fuel flow rate control unit 11 that controls the plurality of fuel flow rate regulating valves 310 and 320.

The fuel flow rate control unit 11 includes a processor 12 that performs various arithmetic processes, and a memory 13 that non-temporarily or temporarily stores various data processed by the processor 12. The processor 12 is realized by a CPU, a GPU, an MPU, a DSP, various other arithmetic devices, or a combination thereof. The memory 13 is realized by a ROM, a RAM, a flash memory, or a combination thereof.

(Problem Caused by Use of Hydrogen Fuel)

As in the first air hole 251 in the gas turbine combustor 100 according to some embodiments, in a case where the air holes 250 extend in a direction inclined with respect to the central axis AXp of the air-hole plate 25, there is a concern that a region where a flow velocity is relatively small may occur locally in the air-hole plate 25 or at a position relatively close to the air-hole plate 25. For example, in a case in which hydrogen having a relatively fast combustion speed is used as a fuel, in a case in which backfire occurs, there is a concern that a flame may continuously remain in the above-described region. In a case where the flame continuously remains in the region, there is a concern that the gas turbine combustor 100 may be damaged.

Therefore, in the gas turbine combustor 100 according to some embodiments, damage to the gas turbine combustor 100 is suppressed as follows.

For example, in the gas turbine combustor 100 according to some embodiments, no hydrogen fuel is supplied to the first fuel nozzle 21 when the hydrogen fuel is exclusively combusted.

When the hydrogen fuel is exclusively combusted, no hydrogen fuel is supplied to the first air hole 251 having the inclined passageway 256, so that it is possible to suppress unintentional continuous remaining of the flame, and it is possible to suppress damage to the gas turbine combustor 100.

In the gas turbine combustor 100 according to some embodiments, the second air hole group G2 may surround the first air hole group G1 when viewed along the central axis AXp of the air-hole plate 25.

Since the first air hole 251 has the inclined passageway 256, a premixed gas of the fuel and the combustion air, which is injected from the first air hole group G1, forms a circulating flow, which makes it easier to retain the flame. In addition, ignition and the flame retention of the premixed gas injected from the second air hole group G2 can be strengthened by the flame of the premixed gas injected from the first air hole group G1. As a result, a flame retaining property of the gas turbine combustor 100 can be improved while suppressing the continuous remaining of unintended flame.

In the gas turbine combustor 100 according to some embodiments, the first air hole group G1 may be formed in a central region Rc including a position at which the central axis AXp of the air-hole plate 25 passes through the air-hole plate 25.

As a result, a circulating flow occurs in the premixed gas in a region downstream of the central region Rc, which makes it easier to retain the flame. In addition, ignition and the flame retention of the premixed gas injected from the second air hole group G2 can be strengthened by the flame of the premixed gas injected from the first air hole group G1. As a result, the flame retaining property of the gas turbine combustor 100 can be improved while suppressing the continuous remaining of unintended flame.

In the gas turbine combustor 100 according to the other embodiment, as shown in FIG. 3B, the first air hole group G1 may be formed at a plurality of locations at intervals along a circumferential direction of the air-hole plate 25.

As a result, a circulating flow occurs in the premixed gas in a region downstream of the plurality of locations at intervals along the circumferential direction of the air-hole plate 25, which makes it easier to retain the flame. In addition, ignition and the flame retention of the premixed gas injected from the second air hole group G2 can be strengthened by the flame of the premixed gas injected from the first air hole group G1. As a result, the flame retaining property of the gas turbine combustor 100 can be improved while suppressing the continuous remaining of unintended flame.

In the gas turbine combustor 100 according to the other embodiment shown in FIG. 2B and FIG. 3B, the inner peripheral air hole 250i corresponding to the fuel nozzle 210 of the first row of the central burner 211, that is, the inner peripheral fuel nozzle 210i, may be the second air hole 252.
(About Ratio of Natural Gas Fuel in Premixed Fuel when Natural Gas Fuel is Exclusively Combusted)

In the gas turbine combustor 100 according to some embodiments, the natural gas fuel may be supplied to the plurality of first fuel nozzles 21 and the plurality of second fuel nozzles 22, such that a ratio of the natural gas fuel in a premixed fuel of the combustion air and the natural gas fuel, which is injected from the first air hole group G1, is larger than a ratio of the natural gas fuel in the premixed fuel, which is injected from the second air hole group G2, when the natural gas fuel is exclusively combusted.

As a result, the flame retaining property when the natural gas fuel is exclusively combusted is improved.
(About Hydrogen Mixed Combustion Ratio During Mixed-Combustion)

In the gas turbine combustor 100 according to some embodiments, the mixed fuel of the hydrogen fuel and the natural gas fuel may be supplied to the plurality of first fuel nozzles 21 and the plurality of second fuel nozzles 22 when a hydrogen mixed combustion ratio, which is a ratio of the hydrogen fuel in the mixed fuel, is equal to or less than a prescribed mixed combustion ratio, and the mixed fuel may be supplied to only the plurality of second fuel nozzles 22 when the hydrogen mixed combustion ratio exceeds the prescribed mixed combustion ratio, when the hydrogen fuel and the natural gas fuel are mixed-combusted.

Since the first air hole 251 corresponding to the first fuel nozzle 21 has the inclined passageway 256, there is a tendency that the continuous remaining of unintended flame is likely to occur. Therefore, in a case where the hydrogen mixed combustion ratio in the mixed fuel of the hydrogen fuel and the natural gas fuel is relatively high, the continuous remaining of unintended flame is likely to occur, but as the hydrogen mixed combustion ratio decreases, the continuous remaining of unintended flame is less likely to occur.

Therefore, as described above, in a case in which the hydrogen mixed combustion ratio exceeds the prescribed mixed combustion ratio, the mixed fuel is supplied to only the second fuel nozzle 22, and no mixed fuel is supplied to the first fuel nozzle 21, so that the continuous remaining of unintended flame can be suppressed. As a result, the continuous remaining of unintended flame can be suppressed while ensuring the flame retaining property of the gas turbine combustor 100.

In a case in which the hydrogen mixed combustion ratio can be varied between the fuel supplied to the first fuel nozzle 21 and the fuel supplied to the second fuel nozzle 22 in the fuel system 300, no hydrogen fuel may be supplied to the first fuel nozzle 21 when the hydrogen fuel and the natural gas fuel are mixed-combusted. In this case, in the fuel system 300, only the natural gas fuel may be suppliable to the first fuel nozzle 21.

As a result, it is possible to further suppress the continuous remaining of unintended flame when the hydrogen fuel and the natural gas fuel are mixed-combusted.

In the gas turbine combustor 100 according to some embodiments, the natural gas fuel may be supplied to the first fuel nozzle 21 and the second fuel nozzle 22 when the natural gas fuel is exclusively combusted.

Since the first air hole 251 corresponding to the first fuel nozzle 21 has the inclined passageway 256, a circulating flow occurs in the premixed gas of the fuel and the combustion air, which is injected from the first air hole 251, which makes it easier to retain the flame. Therefore, the flame retaining property when the natural gas fuel is exclusively combusted can be improved.
(About Control of Hydrogen Mixed Combustion Ratio)

In the gas turbine combustor 100 according to some embodiments, the hydrogen mixed combustion ratio may be controlled as follows.

Figure 5A:
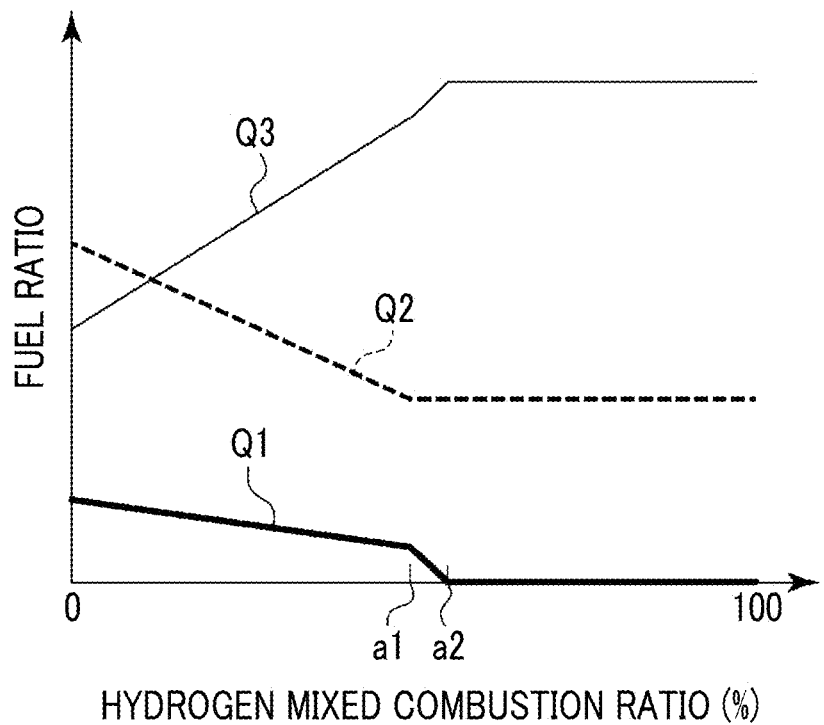
FIG. 5A is a view for describing control of a combustion injection ratio based on a hydrogen mixed combustion ratio in the gas turbine combustor according to the embodiment shown in FIGS. 2A and 3A.

FIG. 5A is a view for describing control of combustion injection ratios Q1, Q2, and Q3 based on the hydrogen mixed combustion ratio in the gas turbine combustor 100 according to the embodiment shown in FIGS. 2A and 3A.

Figure 5B:
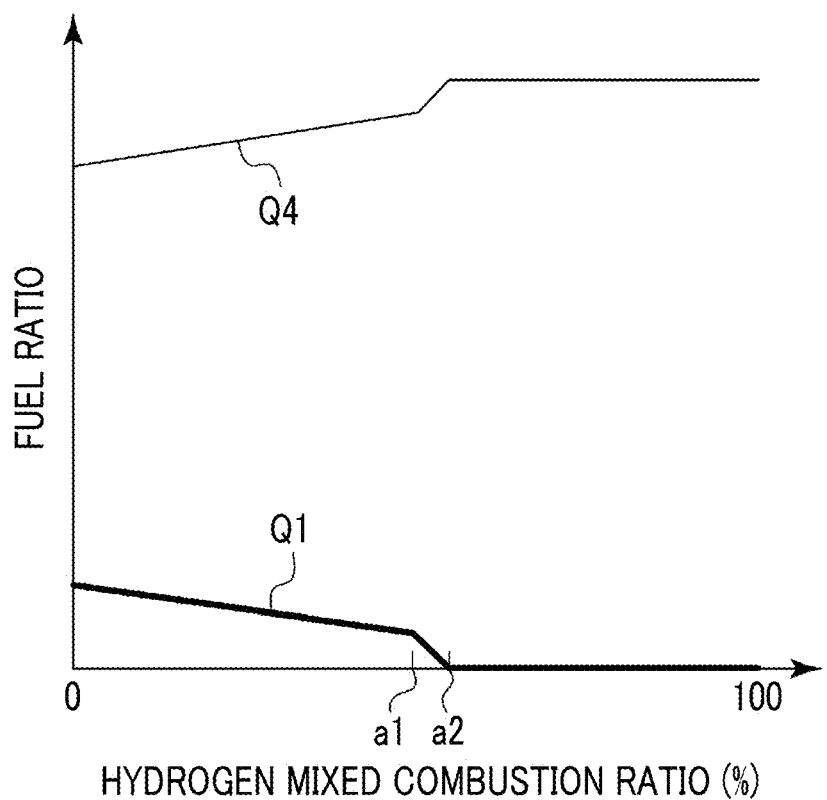
FIG. 5B is a view for describing control of a combustion injection ratio based on a hydrogen mixed combustion ratio in the gas turbine combustor according to the other embodiment shown in FIGS. 2B and 3B.

FIG. 5B is a view for describing control of combustion injection ratios Q1 and Q4 based on the hydrogen mixed combustion ratio in the gas turbine combustor 100 according to the other embodiment shown in FIGS. 2B and 3B.

FIG. 5A shows ratios (hereinafter, also referred to as fuel ratios) of the combustion injection ratios Q1, Q2, and Q3 with respect to the hydrogen mixed combustion ratio. The combustion injection ratio Q1 is a combustion injection ratio from the inner peripheral fuel nozzle 210i of the central burner 211, the combustion injection ratio Q2 is a combustion injection ratio from the inner peripheral fuel nozzle 210i of the outer burner 212, and the combustion injection ratio Q3 is a combustion injection ratio from the outer peripheral fuel nozzles 210o of the central burner 211 and the outer burner 212.

FIG. 5B shows ratios (fuel ratios) of the combustion injection ratios Q1 and Q4 with respect to the hydrogen mixed combustion ratio. The combustion injection ratio Q1 is the combustion injection ratio from the inner peripheral fuel nozzle 210*i* of the central burner 211, and the combustion injection ratio Q4 is a combustion injection ratio from the fuel nozzles 210 other than the inner peripheral fuel nozzle 210*i* of the central burner 211.

As shown in FIG. 5A, in the gas turbine combustor 100 according to the embodiment shown in FIGS. 2A and 3A, in a range in which the hydrogen mixed combustion ratio is equal to or more than zero (that is, when the natural gas fuel is exclusively combusted) and equal to or less than a predetermined first mixed combustion ratio a1 (%), as the hydrogen mixed combustion ratio increases, the combustion injection ratio Q1 from the inner peripheral fuel nozzle 210*i* of the central burner 211 and the combustion injection ratio Q2 from the inner peripheral fuel nozzle 210*i* of the outer burner 212 are gradually decreased, and the combustion injection ratio Q3 from the outer peripheral fuel nozzles 210*o* of the central burner 211 and the outer burner 212 is gradually increased.

In the gas turbine combustor 100 according to the embodiment shown in FIG. 2A and FIG. 3A, in a case in which the hydrogen mixed combustion ratio is equal to or more than the first mixed combustion ratio a1 (%), the combustion injection ratio Q2 from the inner peripheral fuel nozzle 210*i* of the outer burner 212 is a constant value.

In the gas turbine combustor 100 according to the embodiment shown in FIGS. 2A and 3A, in a range in which the hydrogen mixed combustion ratio is equal to or more than the first mixed combustion ratio a1 (%) and equal to or less than a predetermined second mixed combustion ratio a2 (%), as the hydrogen mixed combustion ratio increases, the combustion injection ratio Q1 from the inner peripheral fuel nozzle 210*i* of the central burner 211 is gradually decreased, and the combustion injection ratio Q3 from the outer peripheral fuel nozzles 210*o* of the central burner 211 and the outer burner 212 is gradually increased.

In the gas turbine combustor 100 according to the embodiment shown in FIG. 2A and FIG. 3A, in a case in which the hydrogen mixed combustion ratio is equal to or more than the second mixed combustion ratio a2 (%), the combustion injection ratio Q1 from the inner peripheral fuel nozzle 210*i* of the central burner 211 is zero.

In the gas turbine combustor 100 according to the embodiment shown in FIG. 2A and FIG. 3A, in a case in which the hydrogen mixed combustion ratio is equal to or more than the second mixed combustion ratio a2 (%), the combustion injection ratio Q3 from the outer peripheral fuel nozzles 210*o* of the central burner 211 and the outer burner 212 is a constant value.

In the gas turbine combustor 100 according to the embodiment shown in FIG. 2A and FIG. 3A, in a case in which the hydrogen mixed combustion ratio exceeds the first mixed combustion ratio a1 (%), the combustion injection ratio Q1 from the inner peripheral fuel nozzle 210*i* of the central burner 211 may be zero. That is, the combustion injection ratio Q1 from the inner peripheral fuel nozzle 210*i* of the central burner 211 may be changed stepwise with the first mixed combustion ratio a1 (%) as a boundary.

Similarly, in the gas turbine combustor 100 according to the embodiment shown in FIG. 2A and FIG. 3A, in a case in which the hydrogen mixed combustion ratio exceeds the first mixed combustion ratio a1 (%), the combustion injection ratio Q3 from the outer peripheral fuel nozzles 210*o* of the central burner 211 and the outer burner 212 may be set to the same value as the value in a case in which the hydrogen mixed combustion ratio is equal to or more than the second mixed combustion ratio a2 (%) shown in FIG. 5A. That is, the combustion injection ratio Q3 from the outer peripheral fuel nozzles 210*o* of the central burner 211 and the outer burner 212 may be changed stepwise with the first mixed combustion ratio a1 (%) as a boundary.

In the gas turbine combustor 100 according to the embodiment shown in FIGS. 2A and 3A, a rate of change of the combustion injection ratio Q1 is changed with the first mixed combustion ratio a1 (%) as a boundary, but may remain unchanged.

Similarly, in the gas turbine combustor 100 according to the embodiment shown in FIGS. 2A and 3A, a rate of change of the combustion injection ratio Q3 is changed with the first mixed combustion ratio a1 (%) as a boundary, but may remain unchanged.

As shown in FIG. 5B, in the gas turbine combustor 100 according to the other embodiment shown in FIGS. 2B and 3B, in a range in which the hydrogen mixed combustion ratio is equal to or more than zero (that is, when the natural gas fuel is exclusively combusted) and equal to or less than the second mixed combustion ratio a2 (%), as the hydrogen mixed combustion ratio increases, the combustion injection ratio Q1 from the inner peripheral fuel nozzle 210*i* of the central burner 211 is gradually decreased, and the combustion injection ratio Q4 from the fuel nozzles 210 other than the inner peripheral fuel nozzle 210*i* of the central burner 211 is gradually increased.

In the gas turbine combustor 100 according to the other embodiment shown in FIG. 2B and FIG. 3B, in a case in which the hydrogen mixed combustion ratio is equal to or more than the second mixed combustion ratio a2 (%), the combustion injection ratio Q1 from the inner peripheral fuel nozzle 210*i* of the central burner 211 is zero, and all the fuels are injected from the fuel nozzles 210 other than the inner peripheral fuel nozzle 210*i* of the central burner 211.

In the gas turbine combustor 100 according to the other embodiment shown in FIG. 2B and FIG. 3B, in a case in which the hydrogen mixed combustion ratio exceeds the first mixed combustion ratio a1 (%), the combustion injection ratio Q1 from the inner peripheral fuel nozzle 210*i* of the central burner 211 may be zero. That is, the combustion injection ratio Q1 from the inner peripheral fuel nozzle 210*i* of the central burner 211 may be changed stepwise with the first mixed combustion ratio a1 (%) as a boundary.

Similarly, in the gas turbine combustor 100 according to the other embodiment shown in FIG. 2B and FIG. 3B, in a case in which the hydrogen mixed combustion ratio exceeds the first mixed combustion ratio a1 (%), the combustion injection ratio Q4 from the fuel nozzles 210 other than the inner peripheral fuel nozzle 210*i* of the central burner 211 may be set to the same value as the value in a case in which the hydrogen mixed combustion ratio is equal to or more than the second mixed combustion ratio a2 (%) shown in FIG. 5B. That is, the combustion injection ratio Q4 from the fuel nozzles 210 other than the inner peripheral fuel nozzle 210*i* of the central burner 211 may be changed stepwise with the first mixed combustion ratio a1 (%) as a boundary.

In the gas turbine combustor 100 according to the other embodiment shown in FIGS. 2B and 3B, the rate of change of the combustion injection ratio Q1 is changed with the first mixed combustion ratio a1 (%) as a boundary, but may remain unchanged.

Similarly, in the gas turbine combustor 100 according to the other embodiment shown in FIGS. 2B and 3B, a rate of change of the combustion injection ratio Q4 is changed with the first mixed combustion ratio a1 (%) as a boundary, but may remain unchanged.

(Example of Transition of Hydrogen Mixed Combustion Ratio Over Time)

Figure 6A:
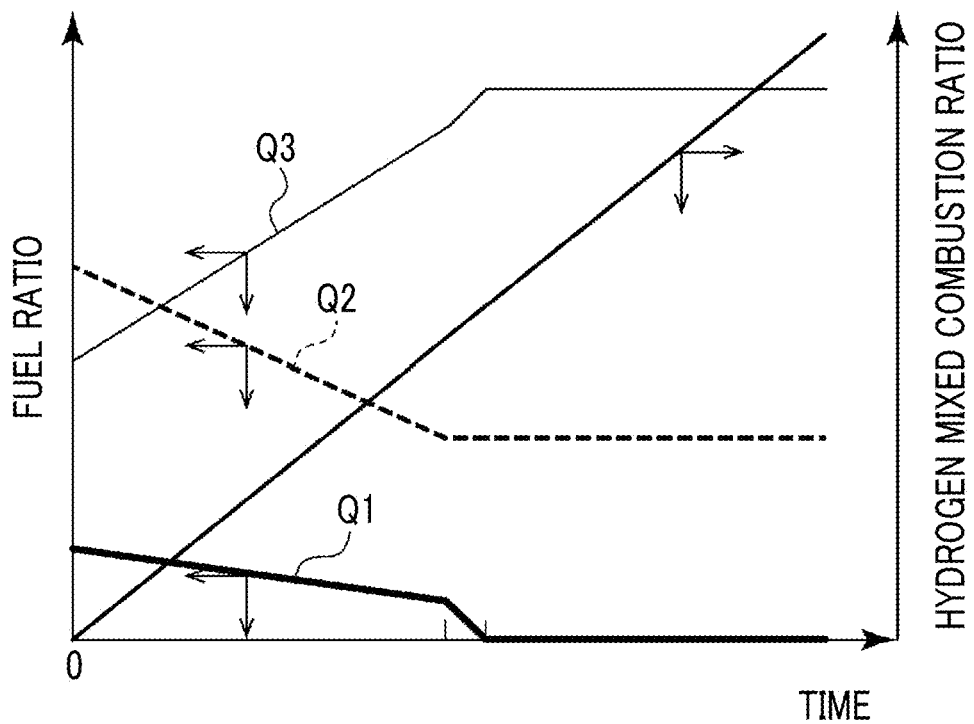
FIG. 6A is a graph showing a transition of a fuel ratio and the hydrogen mixed combustion ratio from a start of operation of the gas turbine provided with the gas turbine combustor according to the embodiment shown in FIGS. 2A and 3A to a transition to exclusive combustion of a hydrogen fuel.

FIG. 6A is a graph showing a transition of a fuel ratio and the hydrogen mixed combustion ratio from a start of operation of the gas turbine 1 provided with the gas turbine combustor 100 according to the embodiment shown in FIGS. 2A and 3A to a transition to exclusive combustion of the hydrogen fuel.

Figure 6B:
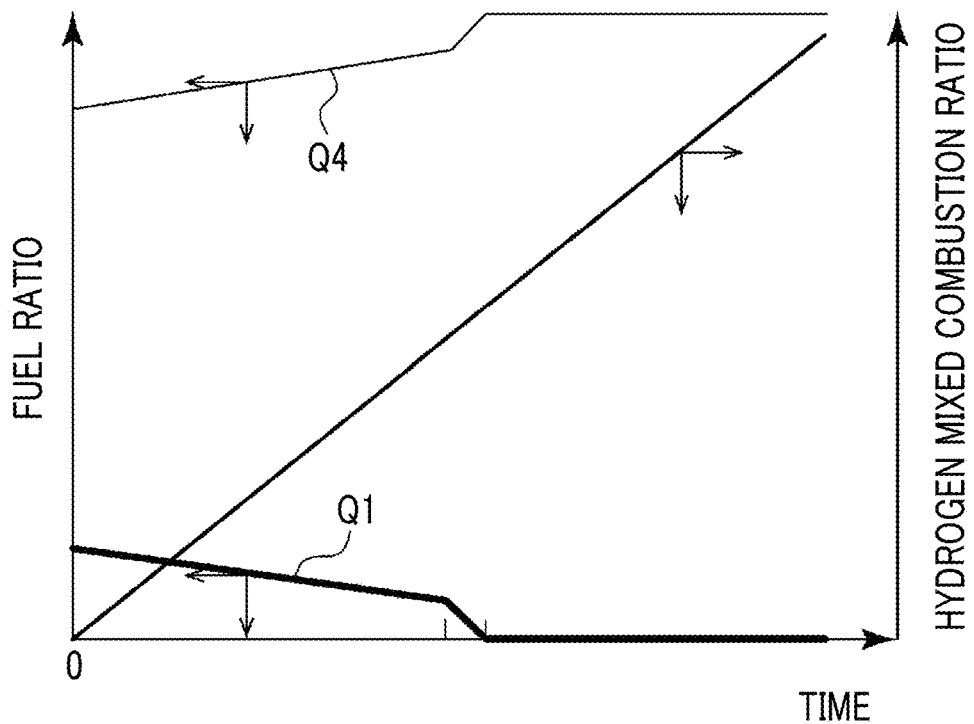
FIG. 6B is a graph showing a transition of the fuel ratio and the hydrogen mixed combustion ratio from a start of operation of the gas turbine provided with the gas turbine combustor according to the other embodiment shown in FIGS. 2B and 3B to a transition to exclusive combustion of the hydrogen fuel.

FIG. 6B is a graph showing a transition of the fuel ratio and the hydrogen mixed combustion ratio from a start of operation of the gas turbine 1 provided with the gas turbine combustor 100 according to the other embodiment shown in FIGS. 2B and 3B to a transition to exclusive combustion of the hydrogen fuel.

As shown in FIGS. 6A and 6B, in the gas turbine combustor 100 according to some embodiments, for example, the operation of the gas turbine 1 may be started by exclusively combusting the natural gas fuel (hydrogen mixed combustion ratio: 0%), and as time elapses, the hydrogen mixed combustion ratio may be gradually increased to transition to the exclusive combustion of the hydrogen fuel (hydrogen mixed combustion ratio: 100%).

(About Control of Fuel Flow Rate Regulating Valves 310 and 320)

In the gas turbine combustor 100 according to some embodiments shown in FIGS. 2A, 2B, 3A, and 3B, the fuel flow rate control unit 11 controls the fuel flow rate regulating valves 310 and 320 as follows.

(Control of Hydrogen Mixed Combustion Ratio)

In the gas turbine combustor 100 according to some embodiments shown in FIGS. 2A, 2B, 3A, and 3B, the processor 12 of the fuel flow rate control unit 11 calculates opening degrees of the hydrogen flow rate regulating valve 311 and the natural gas flow rate regulating valve 312 such that a fuel having a current hydrogen mixed combustion ratio determined by an operation condition or the like of the gas turbine 1 is generated, for example. The processor 12 outputs the control signal for driving the actuators (not shown) of the hydrogen flow rate regulating valve 311 and the natural gas flow rate regulating valve 312 such that the opening degrees of the hydrogen flow rate regulating valve 311 and the natural gas flow rate regulating valve 312 are the calculated opening degrees.

In the hydrogen flow rate regulating valve 311 and the natural gas flow rate regulating valve 312, the actuators (not shown) adjust the opening degrees of the hydrogen flow rate regulating valve 311 and the natural gas flow rate regulating valve 312 by receiving the control signal. As a result, a fuel having a desired hydrogen mixed combustion ratio is generated in the mixing device 307.

(Control of Fuel Ratio)

In the gas turbine combustor 100 according to some embodiments shown in FIGS. 2A, 2B, 3A, and 3B, the processor 12 of the fuel flow rate control unit 11 calculates opening degrees of the first fuel flow rate regulating valve 321, the second fuel flow rate regulating valve 322, the third fuel flow rate regulating valve 323, and the fourth fuel flow rate regulating valve 324 such that the fuel ratio is a fuel ratio corresponding to the current hydrogen mixed combustion ratio determined by the operation condition or the like of the gas turbine 1, for example. The processor 12 outputs the control signal for driving the actuator (not shown) of each of the fuel flow rate regulating valves 321, 322, 323, and 324 such that the opening degree of each of the fuel flow rate regulating valves 321, 322, 323, and 324 is the calculated opening degree.

In each of the fuel flow rate regulating valves 321, 322, 323, and 324, the actuator (not shown) adjusts the opening degree of each of the fuel flow rate regulating valves 321, 322, 323, and 324 by receiving the control signal. As a result, the fuel is injected from each fuel nozzle 210 such that the fuel ratio is the fuel ratio corresponding to the current hydrogen mixed combustion ratio.

The present disclosure is not limited to the above-described embodiments, and includes a modification of the above-described embodiments and an appropriate combination of the embodiments.

For example, the contents described in each embodiment are understood as follows.

(1) A control method for a gas turbine combustor 100 according to at least one embodiment of the present disclosure is a control method for the gas turbine combustor 100 that includes an air-hole plate 25 in which a plurality of air holes 250 are formed and a plurality of fuel nozzles 210 corresponding to the plurality of air holes 250, respectively, and that combusts a hydrogen fuel and another fuel other than the hydrogen fuel. The plurality of air holes 250 include a plurality of first air holes 251 each having an inclined passageway 256 that extends in a direction inclined with respect to a central axis AXp of the air-hole plate 25 in a region including at least an exit end 250b in a passageway 255 from an entry end 250a to the exit end 250b, and a plurality of second air holes 252 that extend parallel to the central axis AXp. The plurality of fuel nozzles 210 include a plurality of first fuel nozzles 21 corresponding to the plurality of first air holes 251, respectively, and a plurality of second fuel nozzles 22 corresponding to the plurality of second air holes 252, respectively. No hydrogen fuel is supplied to the plurality of first fuel nozzles 21 when the hydrogen fuel is exclusively combusted.

According to a method of the above-described (1), when the hydrogen fuel is exclusively combusted, no hydrogen fuel is supplied to the first air hole 251 having the inclined passageway 256, so that it is possible to suppress continuous remaining of unintended flame, and it is possible to suppress damage to the gas turbine combustor 100.

(2) In some embodiments, in the method of the above-described (1), the air-hole plate 25 may include a first air hole group G1 in which the plurality of first air holes 251 are disposed adjacent to each other, and a second air hole group G2 in which the plurality of second air holes 252 are disposed adjacent to each other. The second air hole group G2 may surround the first air hole group G1 when viewed along the central axis AXp.

According to a method of the above-described (2), since the first air hole 251 has the inclined passageway 256, a circulating flow occurs in the premixed gas of the fuel and the combustion air, which is injected from the first air hole group G1, which makes it easier to retain the flame. In addition, ignition and the flame retention of the premixed gas injected from the second air hole group G2 can be strengthened by the flame of the premixed gas injected from the first air hole group G1. As a result, a flame retaining property of the gas turbine combustor 100 can be improved while suppressing the continuous remaining of unintended flame.

(3) In some embodiments, in the method of the above-described (2), the first air hole group G1 may be formed in a central region Rc including a position at which the central axis AXp passes through the air-hole plate 25.

According to a method of the above-described (3), a circulating flow occurs in the premixed gas in a region downstream of the central region Rc, which makes it easier to retain the flame. In addition, ignition and the flame retention of the premixed gas injected from the second air hole group G2 can be strengthened by the flame of the premixed gas injected from the first air hole group G1. As a result, a flame retaining property of the gas turbine combustor 100 can be improved while suppressing the continuous remaining of unintended flame.

(4) In some embodiments, in the method of the above-described (2) or (3), the first air hole group G1 may be formed at a plurality of locations at intervals along a circumferential direction of the air-hole plate 25.

According to a method of the above-described (4), a circulating flow occurs in the premixed gas in a region downstream of the plurality of locations at intervals along the circumferential direction of the air-hole plate 25, which makes it easier to retain the flame. In addition, ignition and the flame retention of the premixed gas injected from the second air hole group G2 can be strengthened by the flame of the premixed gas injected from the first air hole group G1. As a result, a flame retaining property of the gas turbine combustor 100 can be improved while suppressing the continuous remaining of unintended flame.

(5) In some embodiments, in the method of the above-described (3) or (4), the other fuel may be supplied to the plurality of first fuel nozzles 21 and the plurality of second fuel nozzles 22, such that a ratio of the other fuel in a premixed fuel of combustion air and the other fuel, which is injected from the first air hole group G1, is larger than a ratio of the other fuel in the premixed fuel, which is injected from the second air hole group G2, when the other fuel is exclusively combusted.

According to a method of the above-described (5), the flame retaining property when the other fuel is exclusively combusted is improved.

(6) In some embodiments, in the method of any one of the above-described (1) to (5), a mixed fuel of the hydrogen fuel and the other fuel may be supplied to the plurality of first fuel nozzles 21 and the plurality of second fuel nozzles 22 when a hydrogen mixed combustion ratio, which is a ratio of the hydrogen fuel in the mixed fuel, is equal to or less than a prescribed mixed combustion ratio, and the mixed fuel may be supplied to only the plurality of second fuel nozzles 22 when the hydrogen mixed combustion ratio exceeds the prescribed mixed combustion ratio, when the hydrogen fuel and the other fuel are mixed-combusted.

According to a method of the above-described (6), even in a case in which the mixed fuel of the hydrogen fuel and the other fuel is injected from the plurality of first fuel nozzles 21, the continuous remaining of unintended flame can be suppressed. As a result, the continuous remaining of unintended flame can be suppressed while ensuring the flame retaining property of the gas turbine combustor 100.

(7) In some embodiments, in the method of any one of the above-described (1) to (5), no hydrogen fuel may be supplied to the plurality of first fuel nozzles 21 when the hydrogen fuel and the other fuel are mixed-combusted.

According to a method of the above-described (7), it is possible to suppress the continuous remaining of unintended flame when the hydrogen fuel and the other fuel are mixed-combusted.

(8) In some embodiments, in the method of any one of the above-described (1) to (7), the other fuel may be supplied to the plurality of first fuel nozzles 21 and the plurality of second fuel nozzles 22 when the other fuel is exclusively combusted.

According to a method of the above-described (8), the flame retaining property when the other fuel is exclusively combusted can be improved.

(9) A control device 10 for a gas turbine combustor 100 according to at least one embodiment of the present disclosure is a control device 10 for controlling combustion in the gas turbine combustor 100 that includes an air-hole plate 25 in which a plurality of air holes 250 are formed and a plurality of fuel nozzles 210 corresponding to the plurality of air holes 250, respectively, and that combusts a hydrogen fuel and another fuel other than the hydrogen fuel. The plurality of air holes 250 include a plurality of first air holes 251 each having an inclined passageway 256 that extends in a direction inclined with respect to a central axis AXp of the air-hole plate 25 in a region including at least an exit end 250b in a passageway 255 from an entry end 250a to the exit end 250b, and a plurality of second air holes that extend parallel to the central axis. The plurality of fuel nozzles include a plurality of first fuel nozzles 21 corresponding to the plurality of first air holes 251, respectively, and a plurality of second fuel nozzles 22 corresponding to the plurality of second air holes 252, respectively. The control device 10 for the gas turbine combustor 100 according to at least one embodiment of the present disclosure includes a fuel flow rate regulating valve 310, 320 that regulates a flow rate of a fuel supplied to the plurality of first fuel nozzles 21, and a fuel flow rate control unit 11 that controls the fuel flow rate regulating valve 310, 320. The fuel flow rate control unit 11 controls the fuel flow rate regulating valve 310, 320 such that no hydrogen fuel is supplied to the plurality of first fuel nozzles 21 when the hydrogen fuel is exclusively combusted.

According to a configuration of the above-described (9), when the hydrogen fuel is exclusively combusted, no hydrogen fuel is supplied to the first air hole 251 having the inclined passageway 256, so that it is possible to suppress continuous remaining of unintended flame, and it is possible to suppress damage to the gas turbine combustor 100.

REFERENCE SIGNS LIST

10: control device
11: fuel flow rate control unit
21: first fuel nozzle
22: second fuel nozzle
25: air-hole plate
100: gas turbine combustor
210: fuel nozzle
250: air hole
250a: entry end
250b: exit end
251: first air hole
252: second air hole
255: passageway
256: inclined passageway
310: fuel flow rate regulating valve
320: fuel flow rate regulating valve
G1: first air hole group
G2: second air hole group
Rc: central region

The invention claimed is:

1. A control method for a gas turbine combustor that includes an air-hole plate in which a plurality of air holes are formed and a plurality of fuel nozzles corresponding to the plurality of air holes, respectively, and that combusts a hydrogen fuel and another fuel other than the hydrogen fuel, in which the plurality of air holes include a plurality of first air holes each having an inclined passageway that extends in a direction inclined with respect to a central axis of the air-hole plate in a region including at least an exit end in a passageway from an entry end to the exit end, and a plurality of second air holes that extend parallel to the central axis, and the plurality of fuel nozzles include a plurality of first fuel nozzles corresponding to the plurality of first air holes, respectively, and a plurality of second fuel nozzles corresponding to the plurality of second air holes, respectively, the control method comprising:

supplying the other fuel to the plurality of first fuel nozzles and the plurality of second fuel nozzles when the other fuel is exclusively combusted, and supplying no hydrogen fuel to the plurality of first fuel nozzles when the hydrogen fuel is exclusively combusted.

2. The control method for a gas turbine combustor according to claim 1, wherein the air-hole plate includes:

a first air hole group in which the plurality of first air holes are disposed adjacent to each other; and a second air hole group in which the plurality of second air holes are disposed adjacent to each other, and wherein the second air hole group surrounds the first air hole group when viewed along the central axis.

3. The control method for a gas turbine combustor according to claim 2, wherein the first air hole group is formed in a central region including a position at which the central axis passes through the air-hole plate.

4. The control method for a gas turbine combustor according to claim 2, wherein the first air hole group is formed at a plurality of locations at intervals along a circumferential direction of the air-hole plate.

5. The control method for a gas turbine combustor according to claim 3, further comprising:

supplying the other fuel to the plurality of first fuel nozzles and the plurality of second fuel nozzles, such that a ratio of the other fuel in a premixed fuel of combustion air and the other fuel, which is injected from the first air hole group, is larger than a ratio of the other fuel in the premixed fuel, which is injected from the second air hole group, when the other fuel is exclusively combusted.

6. The control method for a gas turbine combustor according to claim 1, further comprising:

supplying a mixed fuel of the hydrogen fuel and the other fuel to the plurality of first fuel nozzles and the plurality of second fuel nozzles when a hydrogen mixed combustion ratio, which is a ratio of the hydrogen fuel in the mixed fuel is equal to or less than a prescribed mixed combustion ratio and supplying the mixed fuel to only the plurality of second fuel nozzles when the hydrogen mixed combustion ratio exceeds the prescribed mixed combustion ratio, when the hydrogen fuel and the other fuel are mixed-combusted.

7. The control method for a gas turbine combustor according to claim 1, further comprising:

supplying no hydrogen fuel to the plurality of first fuel nozzles when the hydrogen fuel and the other fuel are mixed-combusted.

8. A control device for a gas turbine combustor, the control device being for controlling combustion in the gas turbine combustor that includes an air-hole plate in which a plurality of air holes are formed and a plurality of fuel nozzles corresponding to the plurality of air holes, respectively, and that combusts a hydrogen fuel and another fuel other than the hydrogen fuel, in which the plurality of air holes include a plurality of first air holes each having an inclined passageway that extends in a direction inclined with respect to a central axis of the air-hole plate in a region including at least an exit end in a passageway from an entry end to the exit end, and a plurality of second air holes that extend parallel to the central axis, and the plurality of fuel nozzles include a plurality of first fuel nozzles corresponding to the plurality of first air holes, respectively, and a plurality of second fuel nozzles corresponding to the plurality of second air holes, respectively, the control device comprising:

a fuel flow rate regulating valve that regulates a flow rate of a fuel supplied to the plurality of first fuel nozzles; and a fuel flow rate control unit that controls the fuel flow rate regulating valve, wherein the fuel flow rate control unit is operable to control the fuel flow rate regulating valve such that the other fuel is supplied to the plurality of first fuel nozzles and the plurality of second fuel nozzles when the other fuel is exclusively combusted, and to control the fuel flow rate regulating valve such that no hydrogen fuel is supplied to the plurality of first fuel nozzles when the hydrogen fuel is exclusively combusted.

9. A control method for a gas turbine combustor that includes an air-hole plate in which a plurality of air holes are formed and a plurality of fuel nozzles corresponding to the plurality of air holes, respectively, and that combusts a hydrogen fuel and another fuel other than the hydrogen fuel, in which the plurality of air holes include a plurality of first air holes each having an inclined passageway that extends in a direction inclined with respect to a central axis of the air-hole plate in a region including at least an exit end in a passageway from an entry end to the exit end, and a plurality of second air holes that extend parallel to the central axis, and the plurality of fuel nozzles include a plurality of first fuel nozzles corresponding to the plurality of first air holes, respectively, and a plurality of second fuel nozzles corresponding to the plurality of second air holes, respectively, the control method comprising:

supplying a mixed fuel of the hydrogen fuel and the other fuel to the plurality of first fuel nozzles and the plurality of second fuel nozzles when a hydrogen mixed combustion ratio, which is a ratio of the hydrogen fuel in the mixed fuel is equal to or less than a prescribed mixed combustion ratio and supplying the mixed fuel to only the plurality of second fuel nozzles when the hydrogen mixed combustion ratio exceeds the prescribed mixed combustion ratio, when the hydrogen fuel and the other fuel are mixed-combusted; and supplying no hydrogen fuel to the plurality of first fuel nozzles when the hydrogen fuel is exclusively combusted.

* * * * *